Jan. 6, 1959  F. F. LINN  2,867,474
DOLLY AND DEMOUNTABLE PART THEREFOR
Filed April 26, 1955  3 Sheets-Sheet 2
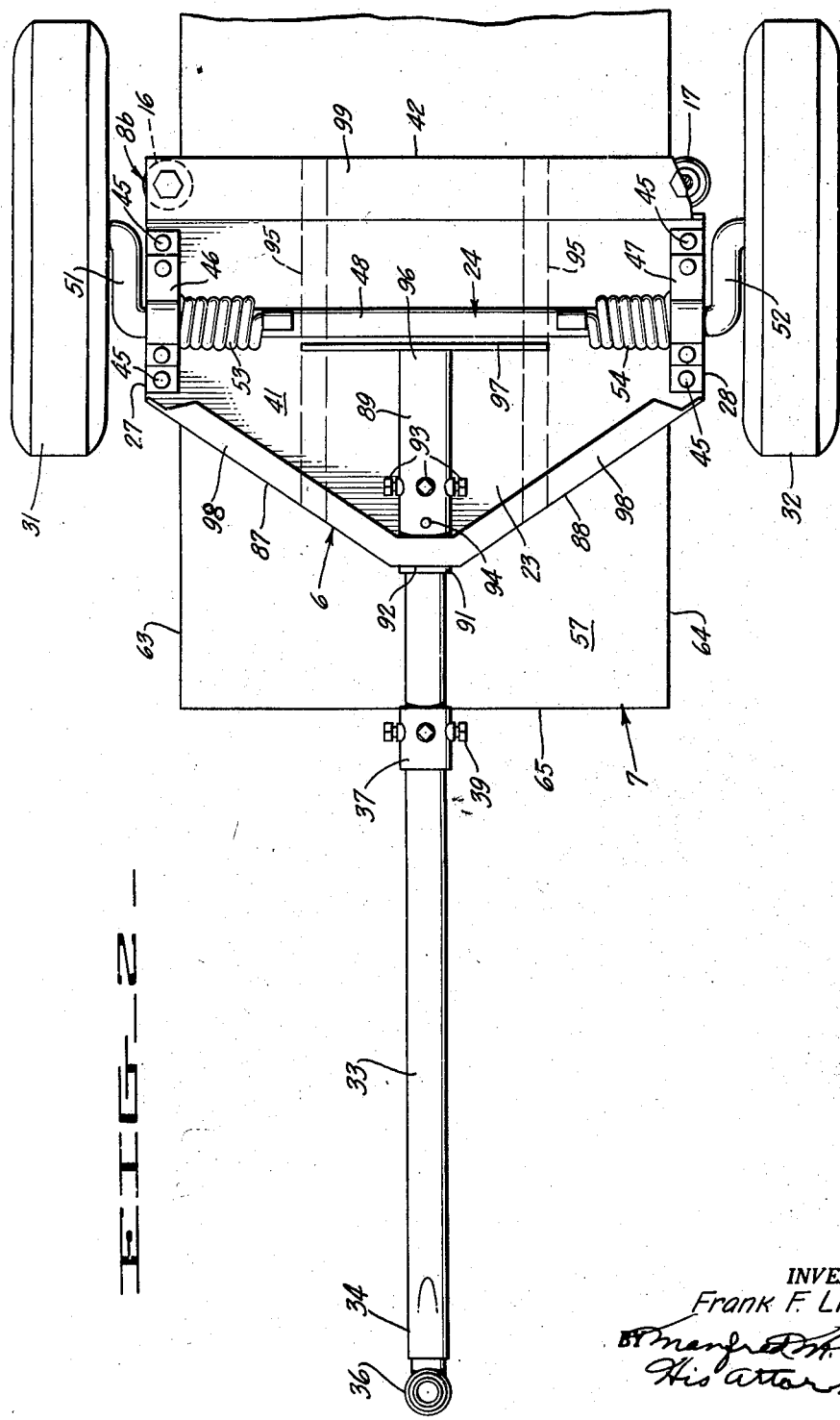
INVENTOR.
Frank F. Linn
BY Manfred M. Warren
His Attorney

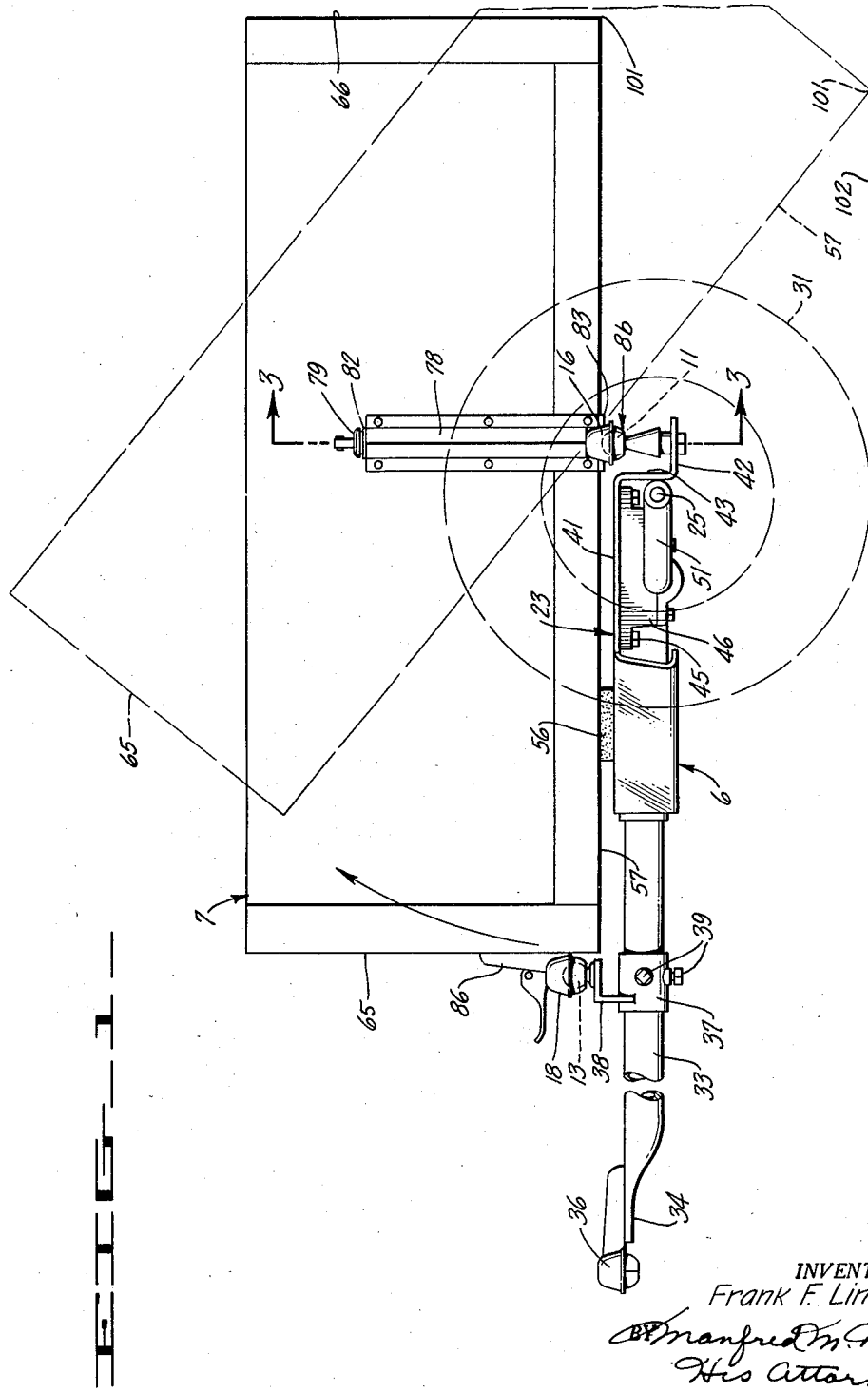

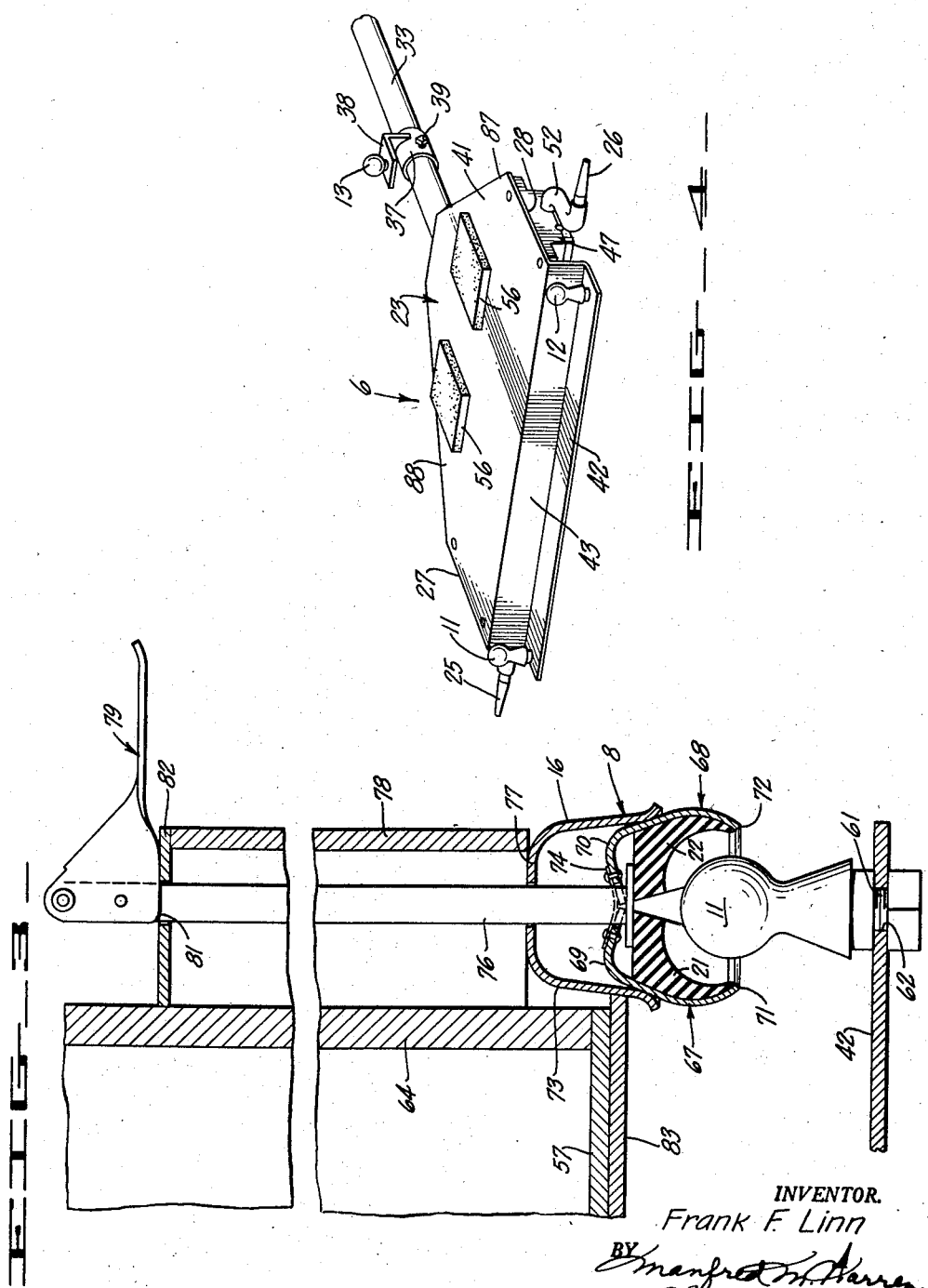

United States Patent Office 2,867,474
Patented Jan. 6, 1959

2,867,474

DOLLY AND DEMOUNTABLE PART THEREFOR

Frank F. Linn, Oakland, Calif.

Application April 26, 1955, Serial No. 504,025

9 Claims. (Cl. 298—5)

The invention relates to mobile material or article handling units such as trailers or the like.

An object of the present invention is to provide a vehicle chassis or dolly which is designed for use with and will support and carry a wide variety of types of bodies or demountable parts and wherein the latter may be applied to the dolly rapidly, easily, and conveniently, and may be removed therefrom with equal facility so as to thereby facilitate and encourage the interchangeable use of a plurality of bodies or other and different types of equipment with the same dolly or chassis.

Another object of the present invention is to provide, in a combination of the character described, a plurality of detachable coupling units affording a silent, cushioned, and wear-free mounting for the body, and which further cooperate to provide a rotative displacement of the body or other part being carried on the chassis to facilitate the mounting and removal of the body, and also for the movement of the body to a dumping or unloading position.

A further object of the present invention is to provide a unit of the character described which may be readily disassembled into its major component parts and all stored within a compact space such as within a trailer body for convenient transportation and storage.

Still another object of the present invention is to provide an assembly of the character described which is composed of a minimum number of simply formed, yet strong and rugged parts and more or less standard component parts which may be quickly and easily assembled to provide a durable and relatively low cost unit.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings:

Figure 1 is a side elevation of a dolly and demountable body constructed in accordance with the present invention.

Figure 2 is a bottom plan view of the dolly and body with a portion of the latter deleted.

Figure 3 is a vertical cross sectional view of the assembly taken substantially on the line 3—3 of Figure 1.

Figure 4 is a perspective view of the dolly.

The assembly of the present invention consists, briefly, of a wheel supported chassis or dolly 6 and a demountable body 7, such as the trailer body here illustrated, and a plurality of detachable fastening units connecting the chassis and body with a pair of such units 8a and 8b arranged for swivel action and being aligned to provide rotative displacement of the body on the chassis to a dumping position, as indicated in dash lines in Figure 1, about an axis connecting the pair of units 8a and 8b. The several detachable fastening units are preferably constructed as more fully illustrated and described in my copending application, Serial No. 419,172, filed March 29, 1954, for Coupling. These include, briefly, a plurality of mounting balls 11, 12 and 13 and a plurality of expandable and contractable ball grasping units 16, 17 and 18 carried by the part or body 7 and positioned for detachable engagement with the balls 11—13. Preferably the units 16—18 each include rubber liner members 21 and 22 which provide a full rubber embrace of the balls 11—13 so as to afford a silent, cushioned, and wear-free mounting for the balls.

The dolly is preferably formed with a substantially horizontal bed 23, an axle 24 mounted on the under side thereof, and having wheel supporting spindles 25 and 26 extending transversely from the opposite sides 27 and 28 of the bed for mounting of a pair of wheels 31 and 32. The pair of mounting balls 11 and 12 are mounted on the bed on a transverse axis parallel to but spaced rearwardly from the axle 24. A draft tongue 33 is secured to the bed 23 and extends forwardly therefrom medially of sides 27 and 28, and is here fitted at its forward end 34 with a trailer hitch or coupling 36, also preferably constructed in accordance with the disclosure of application Serial No. 419,172. In the present showing and as a feature of the present invention, a third mounting ball 13 may be fastened to the tongue 33 so as to provide a central forward support for the body 7 in a three-point supporting arrangement. The latter is very desirable in some instances for insuring a full bearing support and elimination of torsional strain in the carried part. Also preferably the mounting of ball 13 on tongue 33 is arranged in a manner providing longitudinal adjustment of the ball on the tongue. As here shown, the tongue is formed as a tubular piece such as a pipe, and a sleeve 37 is provided thereon for mounting of ball 13, the latter being secured to the sleeve by a bracket 38. The sleeve may be held in adjusted longitudinal position on the tongue 33 by means of a plurality of set screws 39.

The bed 23 is preferably formed out of sheet steel or the like to provide a flat platelike structure which, in accordance with the present construction, is stepped across a transverse axis to provide a relatively elevated flat forward portion 41 and a relatively lowered rearward portion 42 connected by a vertically arranged step or shoulder 43. A Linco "Level-Load" trailer axle is preferably used in the present unit in the interest of obtaining the lowest and most compact arrangement. This axle is more fully illustrated and described in my Patent No. 2,426,513. Briefly, this axle consists of a pair of bearings 46 and 47 secured, as by bolts 45, in transversely aligned position to the under side of the forward portion 41 of the bed adjacent the opposite sides 27 and 28 of the bed, a main axle shaft 48 which is journaled in the bearings for rotation about a transverse axis and which extends outwardly from the bearings 46 and 47 and the sides 27 and 28, where the shaft is bent into offset arms 51 and 52 which terminate at their outer ends in co-axially arranged and transversely extending wheel supporting spindles 25 and 26 which are carried by the arms rearwardly of the axis of shaft 48 for arcuate displacement about the axis, and a pair of helical springs 53 and 54 which are secured at their opposite ends to the shaft 48 and the bearings 46 and 47 for resisting arcuate displacement of the arms and thus providing a spring suspension for the body. Preferably and as best seen in Figures 1 and 4, the balls 11 and 12 are mounted on the stepped part 42 spaced to the rear of the bearings 46 and 47 and so as to locate the wheel spindles 25 and 26 on a transverse axis lying generally between the transverse axis of balls 11 and 12 and of the axis of rotation of axle shaft 48 to thus effect a straddle mounting of the wheels between the points of support of the axles and body 7.

The body 7 or other part to be supported may, if desired, be rested directly upon the forward elevated flat portion 41 of the bed. One or more pads 56 may be interposed between the bed 23 and the under side 57 of the body where desired. These pads may be formed of rubber or other resiliently compressible material to cushion the support. In this connection it will be noted that the lowering of the rear step part 42 permits the use of the ball couplings and also the direct support of the body on the bed where desired, thus distributing the area of support.

The carried part or body 7 may be of any number of types or forms. For example, pieces of portable equipment such as welders, air compressors, and the like which are required to be carried about from place to place may be fitted with the ball grasping means 16—18 in position for engagement with the several balls mounted on the chassis. Material handling equipment such as hand trucks may be similarly equipped before transporting such equipment and articles or material carried thereby. Similarly, special supports as, for example, boats, lumber, logs, etc., may be fitted with the ball grasping units for snapping onto and from the dolly as desired. A pair of dollies may be connected in tandem by securing the coupling 36 at the front of the tongue 33 of a rearwardly disposed dolly to one of the balls 11 or 12, or preferably one centrally located, at the rear of the forwardly disposed dolly. To facilitate all such arrangements, a set of standard spacings for the mounting balls may be evolved. As here shown the balls are provided with a threaded mounting stud 61 and the flat platelike form of the bed 23 permits the provision of such a number and arrangement of openings 62 for the studs as may be required.

One of the most useful applications is the detachable mounting of a trailer body as here shown. Such a body may be of conventional box-like structure having a bottom 57, side walls 63 and 64, a rear end wall 66 and a forwardly disposed end wall 65. The ball grasping units 16 and 17 are here mounted on the side walls 63 and 64 at or near the middle of the length of such walls so as to support the body near its center and for rotative displacement to dumping position as illustrated. As above noted, the ball grasping units are more fully illustrated and described in my co-pending application, Serial No. 419,172, and are available commercially as the Linco Trailer Coupler. The unit consists, briefly, of a pair of clam-shell sections 67 and 68 connected adjacent one end 69 and 70 for swinging movement of their opposite ends 71 and 72 from a spaced apart open position, as illustrated in Figure 3, to a closed position as indicated in Figure 1, so as to receive and embrace one of the balls 11—13. As a particularly important feature of the coupler, the sections 67 and 68 are provided with rubber pad members or liners 21 and 22 which are formed with inside surfaces of segmental spherical form cooperating in the closed position of the sections to embrace the periphery of the ball 11, it being noted that the lower open ends of the sections extend around the lower portion of the ball above its stud so as to permit universal swiveling action between the sections and the balls.

Support for the sections in their closed position is provided by a bell-shaped housing or casing 73 having an interior chamber adapted to receive the connected ends 69 and 70 of the sections and an interior wall arranged to engage and displace the sections to closed position upon movement of the sections into the chamber. A spring member 74 is secured to the upper ends 69 and 70 for constantly urging the section to their spaced apart position so that on displacement of the sections out of the bell housing 73 they will automatically open to the position indicated. An elongated strap shaped actuator member 76 is secured to the connected ends 69 and 70 of the sections and extends therefrom through the upper wall 77 of the bell housing and there projects upwardly at the outer side of the body in a casing 78 secured to the body side. Displacement of the actuating member 76 to cause the movement of the sections 67 and 68 between their open and closed position is effected by a manually engageable lever 79 pivotally connected to the upper end of the actuator member 76 and having a cam portion 81 engageable with a bearing washer 82 mounted on the upper end of the casing 78. As will be understood, the action of the lever and its cam is to effect displacement of the sections 67 and 68 into the bell housing upon downward displacement of the lever, and contrariwise a releasing of the sections for movement out of the bell housing upon raising of the lever, the arrangement also preferably providing for an over-center locked position of the lever in its downwardly pressed position. The bell housings 73 may be supported at the lower extremity of the sides 63 and 64 of the body by mounting plates 83 secured as by welding to the bell housing and extending under the bottom 57 of the body for attaching thereto as by welding or bolts or the like. As will be seen in Figure 1, the casing 78 is extended vertically to a height somewhat above the top of the wheels 31—32 so as to locate the operating lever 79 at a conveniently accessible position. The unit 18 disposed at the front of the body may be secured to the front wall 65 by a bracket 86 secured to the bell housing of the unit and to the front wall.

With reference to Figures 2 and 4, it will be noted that the opposite sides 27 and 28 of the bed are preferably tapered over forwardly disposed side portions 87 and 88 to as to provide a forwardly pointed dolly with the side portions 87 and 88 converging to the point of attachment of the tongue 33. Connection of the tongue to the bed is here effected by the provision of a tube or sleeve 89 welded or otherwise secured to the underside of the bed with the axis of the tube longitudinal and with the forward end 91 of the tube projecting through the front 92 of the wall portions 87 and 88 for slidably receiving within the tube 89 the rearwardly disposed end of the tongue 33. The latter may be adjustably secured within the tube 89 by setscrews 93 and may be locked in the sleeve by a safety pin 94. The rear end 96 of the tube 89 may be closed off by a reinforcing web 97 welded or otherwise secured to the underside of the bed. Also if desired, one or more braces 95 may be fastened across in-turned bottom edges 98 of the wall portions 87 and 88 and the underside 99 of the stepped-down portion 42 of the bed for boxing in the axle 48 and generally reinforcing the structure.

As will be observed, the unit may be easily and quickly disassembled into its principal component parts. To remove the body 7 the forward ball grasping unit 18 may be opened and the body swung upwardly and rotated about the two rearwardly disposed balls 11 and 12 to the position indicated in dotted lines in Figure 1, with the rear end 101 of the body bottom 57 engaged on the ground 102. In this position the body may be further elevated at its forward end 65 upon opening of the ball grasping units 16 and 17 so as to thereby release the body from the dolly. As will be understood, replacement of the body upon the dolly may be effected in a reverse manner by first tipping up the body, then running the dolly under the body so as to engage the ball grasping means 16 and 17 with balls 11 and 12, after which the forward end 65 of the body may be lowered back to normal horizontal positions when the forwardly disposed ball grasping unit 18 will be automatically positioned for engagement with ball 13. The tongue 33 may be easily removed by loosening set screws 93 and removal of safety pin 94. The axle 24 may be easily removed by detaching bolts 45. The wheels 31 and 32 may be removed from their spindles in the conventional manner, following which all of the component parts, viz., the wheels 31 and 32, the axle 24, the dolly bed 23, and the tongue 33 may be placed within the body 7 for convenient storage or transportation.

I claim:

1. A dolly and demountable part therefor comprising, a wheel supported chassis, a plurality of mounting balls carried by said chassis, and a plurality of expandable and contractable ball grasping units carried by said part and positioned for detachable engagement with said balls and each having a manually engageable and displaceable operative handle for effecting quick attachment to and detachment from one of said balls, said balls and units being designed for swivel action, and a pair of said balls and units being arranged to provide rotative displacement of said part on said chassis about an axis connecting said pair of balls.

2. A dump trailer comprising, a wheel supported chassis, at least three mounting balls carried by said chassis, a trailer body, a plurality of expandable and contractable ball grasping units carried by said body and positioned for detachable engagement with said balls, manually operated means for expanding and contracting each of said units for respectively releasing and attaching each unit to one of said balls, said balls and units being designed for swivel action, and a pair of said balls and units being arranged to provide rotative displacement of said body to dumping position about an axis connecting said pair of balls upon release of the other unit from its engaged ball.

3. A dolly and a demountable part therefor comprising, a wheel supported chassis including a substantially horizontal bed, an axle mounted on said bed and having wheel supporting spindles extending transversely from the opposite sides thereof, a tongue secured to said bed and extending forwardly thereof medially of said sides, a pair of mounting balls carried by said bed on a transverse axis parallel to but spaced from said axle, a mounting ball carried by said tongue, and expandable and contractable ball grasping units carried by said part and positioned for detachable engagement with said balls, said units cooperating with said pair of balls to define a fulcrum on said axis affording mechanical advantage in raising and lowering said part relative to said dolly.

4. A dolly and a demountable part therefor comprising, a wheel supported chassis including a substantially horizontal bed, an axle mounted on said bed and having wheel supporting spindles extending transversely from the opposite sides thereof, a tongue secured to said bed and extending forwardly thereof medially of said sides, a pair of mounting balls carried by said bed on a transverse axis parallel to but spaced from said axle, a third mounting ball, mounting means for said third ball carried by said tongue for adjustable positioning longitudinally thereof, and expandable and contractable ball grasping units carried by said part and positioned for detachable engagement with said balls, said units cooperating with said pair of balls to define a fulcrum on said axis affording mechanical advantage in raising and lowering said part relative to said dolly.

5. A dump trailer comprising, a wheel supported chassis including a plate-like bed stepped across a transverse axis to provide a relatively elevated flat forward portion and a relatively lowered rearward portion, an axle mounted on and extending transversely of said forward portion and having wheel supporting spindles extending transversely from the opposite sides of said bed, a trailer body formed for mounting on said forward portion and overhanging said rearward portion, a pair of mounting balls mounted in transversely aligned position on said rearward portion, and a pair of expandable and contractable ball grasping units carried by said body and positioned for detachable engagement with said balls, said balls and units being designed for swivel action so as to provide rotative displacement of said body to a lowered dumping position of the rear end thereof about a transverse axis connecting said balls.

6. A dump trailer comprising, a wheel supported chassis including a plate-like bed stepped across a transverse axis to provide a relatively elevated flat forward portion and a relatively lowered rearward portion, an axle mounted on and extending transversely of said forward portion and having wheels supporting spindles extending transversely from the opposite sides of said bed, a tongue secured to said bed and extending forwardly thereof medially of said sides, a trailer body formed for mounting on said forward portion and overhanging said rearward portion, and said tongue, a pair of mounting balls mounted in transversely aligned position on said rearward portion, a mounting ball carried by said tongue, and expandable and contractable ball grasping units carried by said body and positioned for detachable engagement with said balls, said balls and units being designed for swivel action so as to provide upon disengagement of the ball on said tongue a rotative displacement of said body to a lowered dumping position of the rear end thereof about a transverse axis connecting said balls on said lowered rearward portion.

7. A dump trailer comprising, a wheel supported chassis, including a plate-like bed stepped across a transverse axis to provide a relatively elevated flat forward portion and a relatively lowered rearward portion, bearings secured in transversely aligned position to the underside of said forward portion adjacent to the opposite sides of said bed, axle means journalled in said bearings for rotation about a transverse axis and extending outwardly from said sides and provided with offset arms and coaxially arranged and transversely extending wheel supporting spindles carried by said arms rearwardly of said axis for arcuate displacement about said axis, spring means resisting said arcuate displacement of said arms, a trailer body formed for mounting on said forward portion and overhanging said rearward portion, a pair of mounting balls mounted in transversely aligned position on said rearward portion rearwardly of said spindles, and a pair of expandable and contractable ball grasping units carried by said body and positioned for detachable engagement with said balls, and cooperating with said balls to define a fulcrum affording mechanical advantage in raising and lowering said body relative to said chassis.

8. A dump trailer comprising, a wheel supported chassis including a plate-like bed stepped across a transverse axis to provide a relatively elevated flat forward portion and a relatively lowered rearward portion, bearings secured in transversely aligned position to the under side of said forward portion adjacent the opposite sides of said bed, axle means journalled in said bearings for rotation about a transverse axis and extending outwardly from said sides and provided with offset arms and coaxially arranged and transversely extending wheel supporting spindles carried by said arms rearwardly of said axis for arcuate displacement about said axis, spring means resisting said arcuate displacement of said arms, a tongue secured to said bed and extending forwardly thereof medially of said sides, a trailer body formed for mounting on said forward portion and overhanging said rearward portion and said tongue, a pair of mounting balls mounted in transversely aligned position on said rearward portion rearwardly of said spindles, a mounting ball carried by said tongue, and expandable and contractable ball grasping units carried by said body and positioned for detachable engagement with said balls, said balls and units being designed for swivel action so as to provide upon disengagement of the ball on said tongue a rotative displacement of said body to a lowered dumping position of the rear end thereof about a transverse axis connecting said balls on said rearward portion.

9. In combination, a wheel supported chassis part and a demountable part, a plurality of mounting balls carried by one of said parts, and a plurality of expandable and contractible ball grasping units carried by the other of said parts and positioned for detachable engagement with said balls and each having a manually engageable and displaceable operative handle for effecting quick attachment to and detachment from one of said balls, said balls and units being designed for swivel action, and a pair of said balls and units being arranged to provide rotative displacement of said demountable part on said chassis part about an axis connecting said pair of balls.

References Cited in the file of this patent
UNITED STATES PATENTS

| | | |
|---|---|---|
| 1,373,000 | Gilbert et al. | Mar. 29, 1921 |
| 1,659,245 | Delker | Feb. 14, 1926 |
| 1,881,958 | Peo | Oct. 11, 1932 |
| 2,170,980 | Thorp et al. | Aug. 29, 1939 |
| 2,426,513 | Linn | Aug. 26, 1947 |
| 2,491,417 | Pflantz et al. | Dec. 13, 1949 |
| 2,609,212 | McMurtrie | Sept. 2, 1952 |